United States Patent [19]

Sasuta

[11] Patent Number: 5,230,083
[45] Date of Patent: Jul. 20, 1993

[54] METHOD FOR REDUCING CONTROL CHANNEL TRAFFIC IN A COMMUNICATION SYSTEM

[75] Inventor: Michael D. Sasuta, Mundelein, Ill.

[73] Assignee: Motorola, Inc., Schaumburg, Ill.

[21] Appl. No.: 828,328

[22] Filed: Jan. 30, 1992

[51] Int. Cl.$^5$ .............................................. H04Q 7/00
[52] U.S. Cl. ................................... 455/34.1; 455/56.1
[58] Field of Search ..................... 455/34.1, 54.1, 54.2, 455/53.1, 33.1, 56.1; 379/63, 59

[56] References Cited

U.S. PATENT DOCUMENTS

| | | | |
|---|---|---|---|
| 4,723,264 | 2/1988 | Sasuta | 455/54.2 |
| 5,020,130 | 5/1991 | Grube et al. | 379/63 |

*Primary Examiner*—Reinhard J. Eisenzopf
*Assistant Examiner*—Andrew Faile
*Attorney, Agent, or Firm*—Timothy W. Markison; Steven G. Parmelee

[57] ABSTRACT

In a network of communication systems, control channel traffic can be reduced in a communication system in the following manner. When a source communication unit initiates a communication with at least one target communication unit, that source communication unit generates an individual reference address for the target communication unit and stores that individual reference in an internal data base. Having generated the individual reference address, the source communication unit transmits the reference address to the communication resource allocator of the communication system that it is registered in. The communication resource allocator then determines whether the individual reference of the target communication unit is stored in a reference address data base, located within the communication resource allocator, for the source communication unit. If the individual reference address of the target communication unit is not stored in the reference address data, the reference address data base is updated with that information.

14 Claims, 2 Drawing Sheets

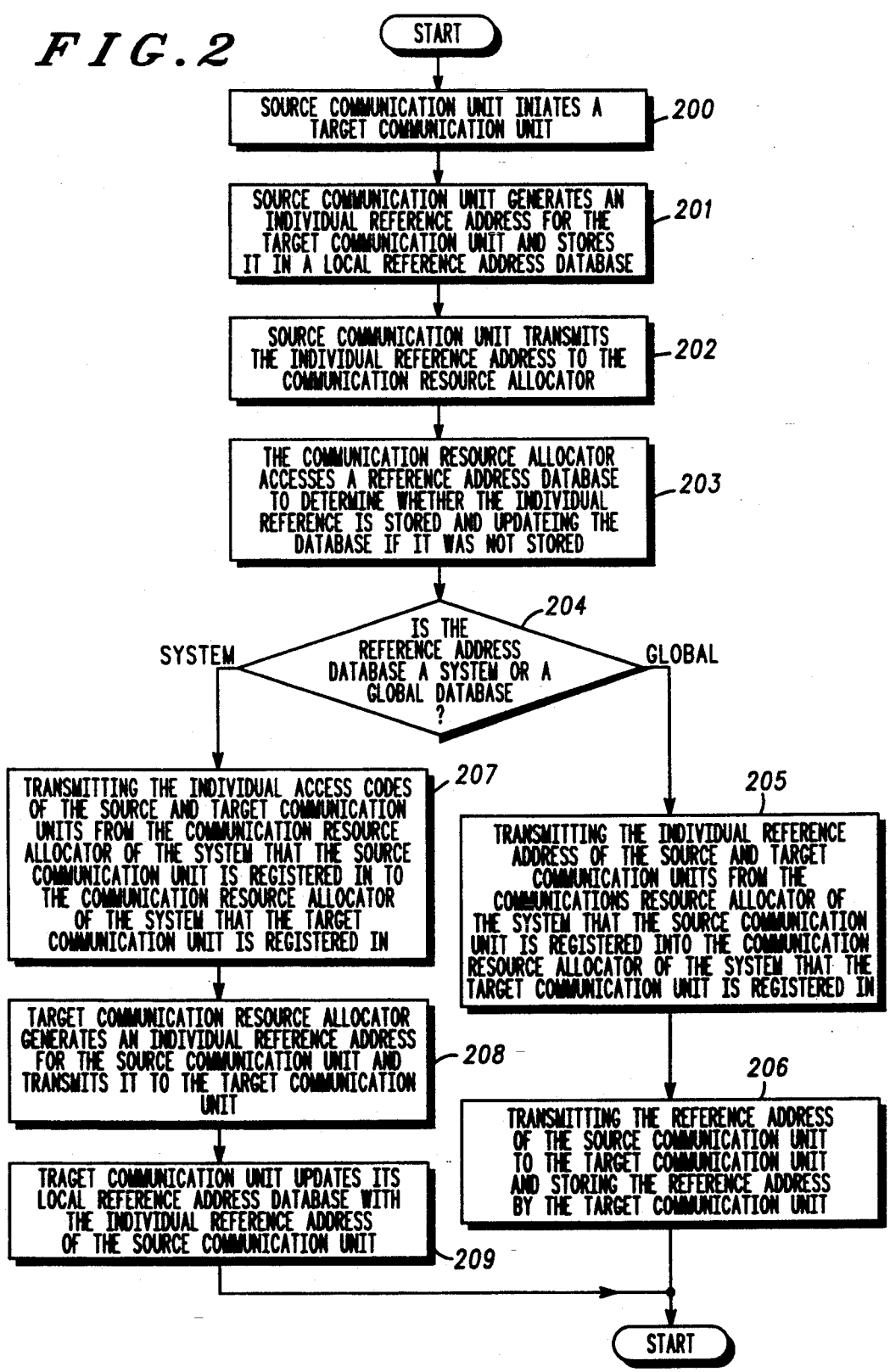

METHOD FOR REDUCING CONTROL CHANNEL TRAFFIC IN A COMMUNICATION SYSTEM

FIELD OF THE INVENTION

This invention relates generally to a network of communication systems and in particular to a method that reduces control channel traffic in a communication system of the network.

BACKGROUND OF THE INVENTION

Communication system networks are known to comprise a plurality of communication systems. Each communication system further includes a plurality of communication units, a limited number of communication resources that are transceived via a predetermined number of repeaters, or base stations, and a communication resource allocator that allocates the limited number of communication resources among the plurality of communication units. The communication resources may be a TDM bus or buses, a frequency carrier, a pair of frequency carriers, or any other RF transmission means.

To establish a communication between communication units, which may be mobile or portable radios, a requesting communication unit transmits an inbound signalling word (ISW) to the communication resource allocator of the communication system that the requesting communication unit is registered in. The ISW contains an individual identification code of the requesting communication unit, a home communication system code of the requesting communication unit and the same codes for any targeted communication unit. Thus, the targeted communication unit must be addressed by both its individual identification and its home communication system code.

The communication resource allocator of the communication system that the requesting communication unit is registered in, after granting the transmission request, transmits the individual identification code and the home communication unit of the target communication unit and the same information for the requesting communication unit to the communication resource allocator of the communication system that the target communication unit is registered in. Once the communication resource allocator of the communication system that the target communication unit is registered in processes the transmission request, it transmits the identifying codes of the requesting communication unit to the target communication unit. By transmitting both the individual and home system codes of the target and requesting communication unit, the control channel traffic in both communication systems is increased by the relatively large addressing of each communication unit.

Therefore, a need exists for a method that will reduce the control channel traffic in a communication system that is part of a communication system network.

SUMMARY OF THE INVENTION

This need and others are substantially met by the method for reducing control channel traffic in a communication system disclosed herein. In a network of communication systems, wherein each communication system includes a plurality of communication units, a limited number of communication resources that are transceived via a predetermined number of repeaters, and a communication resource allocator that allocates the limited number of communication resources among the plurality of communication units, wherein a communication unit of one communication system functions in any of the other communication systems in the network, and wherein a communication unit communicates either within the communication system that it is presently registered in or in any other communication system of the communication system network, the following method reduces control channel traffic in a communication system of the network.

Once a source, or requesting, communication unit has initiated a communication with at least one target communication unit, the source communication unit generates an individual reference address for each of the at least one target communication units when an individual reference address does not exist within a local reference address data base. Having accessed the individual reference address for each of the at least one target communication units, the source communication unit transmits the individual reference address to the communication resource allocator of the communication system that the source communication unit is registered in. The communication resource allocator determines whether the individual reference address for each of the at least one target communication unit is stored in a reference address data base within the communication resource allocator for that source communication unit. If the reference address data base does not contain the individual reference address of one of the at least one target communication units, it is updated to include that reference.

BRIEF DESCRIPTION OF THE DRAWINGS

FIG. 2 illustrates a logic diagram that may be used in the communication system of FIG. 1 to implement the present invention.

DESCRIPTION OF A PREFERRED EMBODIMENT

Figure 1:
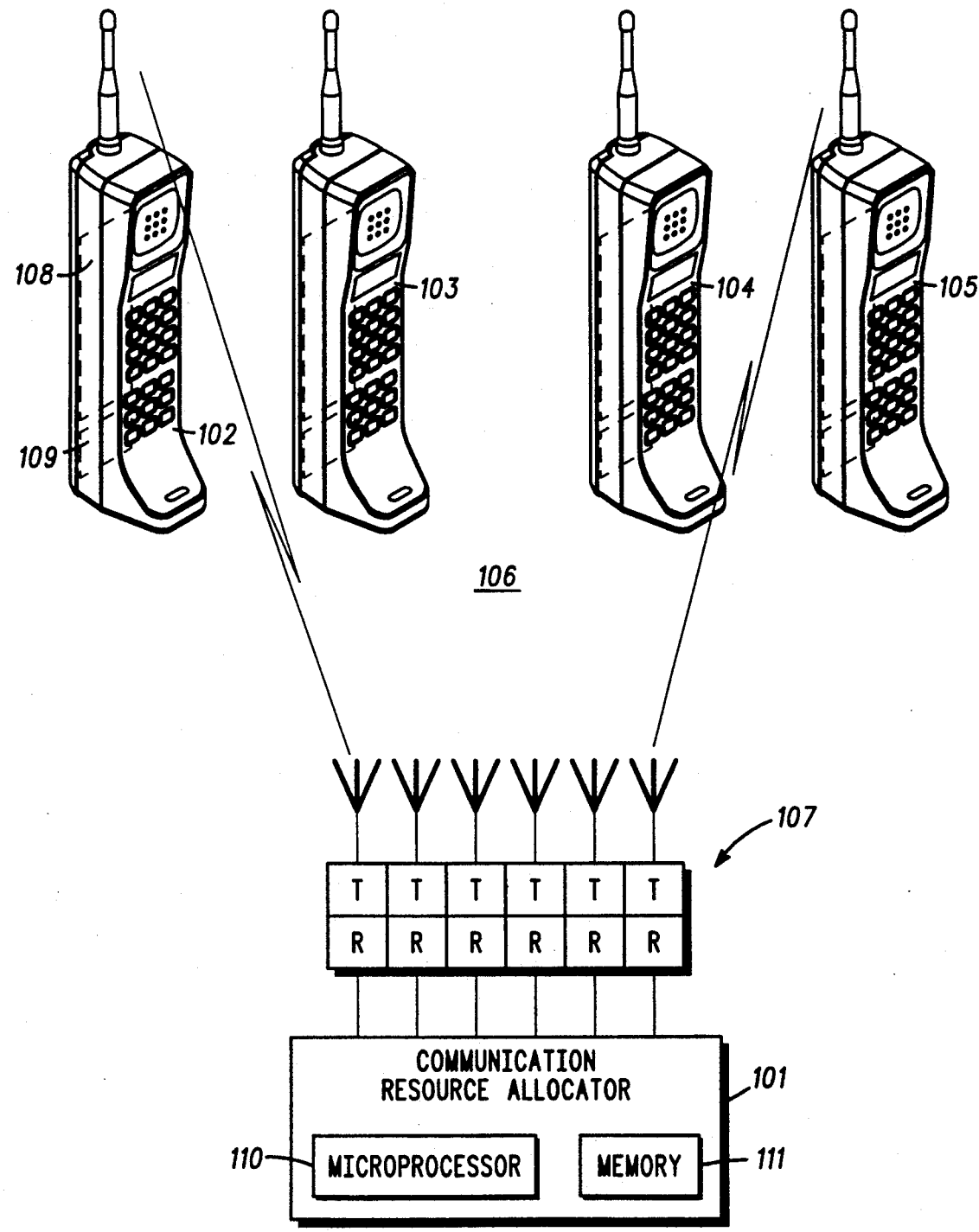
FIG. 1 illustrates a communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

As is known, the trunking communication system of FIG. 1 may be part of communication system network (not shown). In a communication system network, the communication resource allocator of one system communicates with the communication resource allocator of the other communication systems in the network. The communication resource allocators communicate either via a hub network computer or via a special communication resource control channel. Each of the communication units that operate within a communication system network are identified by their individual identification code and a home communication system code. For a requesting, or source, to initiate a communication, it transmits an inbound signalling word (ISW) to the communication resource allocator of the system that it is registered in. The ISW will identify the target communication units and request allocation of a communication resource. The communication resource allocator processes the ISW and transmits an outbound signalling word (OSW) to the communication unit. The OSW is a response to the communication request which may be an allocation of a communication resource or a denial. The process of establishing a communication between communication units in the communication system network may be improved by incorporating the method of FIG. 2, wherein the respective portions are programmed into microprocessors of the communication resource allocator and the communication units.

At step 200 of FIG. 2, a source communication unit initiates a communication with at least one target communication unit by transmitting an ISW to the communication resource allocator that it is registered. In addition to transmitting an ISW, the source communication unit generates an individual reference address for the target communication and stores it in a local reference address data base which is contained within the communication unit in its memory 201. The individual reference address for the target communication unit may be an abbreviated address or an alias, such as 'captain', or any other one word reference. The length of the one word reference is dependent upon the particular type of communication being used, for example, a five digit display will allow any word or alpha numeric combination of up to five characters. Thus, when the source communication unit transmits the ISW to the communication resource allocator, the individual reference address for the target communication unit is included instead of its individual code and home communication system code 202.

After receiving the ISW, the communication resource allocator accesses a reference address data base to determine whether the individual reference address is stored for the particular source communication unit and updates the data base if it was not 203. The reference address data base may be a data base contained within the communication resource allocator of a system 204, or it may be a global reference address data base contained within the hub network computer 204. In either case, the data base comprises memory which stores, for each communication unit, the individual reference addresses that that communication unit has generated for its target communication units.

If the reference address data base is a global data base, the communication resource allocator of the system that the source communication unit is registered in transmits the individual reference address of the source communication unit and the target communication unit to the communication resource allocator of the system that the target communication unit is registered in 205. Note that the communication resource allocator of the system that the source communication unit is in can transmit the individual reference of the source and target communication unit to to each communication resource allocator of a system that has a target communication unit registered in it. Once the communication resource allocator of the system that the target communication unit is registered in receives the individual reference addresses of the source and target communication unit, it transmits the reference address of the source communication unit to the target communication unit 206. The target communication unit will update its local reference address data base with the source communication unit individual reference address if such information is not already contained in the data base 206.

With a global reference address data base, a communication unit can initiate a communication with any target communication unit in any system by transmitting only the individual reference address of the target communication units. Thus, only one word or bit frame, needs to be transmitted to initiate a communication in a network system. In contrast, a prior art communication system network would require the source communication unit to transmit both the individual identification code of the target communication and also the identification code of the target communication units home communication system which comprises two words or two bit frames.

If the reference address data base is a system reference address data base i.e. contained within each communication resource allocator, a communication resource allocator of the system that the source communication unit is in transmits the individual access codes of the source and target communication units to the communication resource allocator of the system that the target communication unit is registered in 207. The individual access codes comprise the individual identification code of the communication units and the identification code of the communication units home system. Having received the individual access codes, the communication resource allocator of the system that the target communication unit is registered in, generates an individual reference address for the source communication unit and transmits it to the target communication unit 208. The target communication unit updates its local reference address data base with the individual reference address of the source communication unit if needed 209.

With a system reference address data base, a communication unit may establish a communication within the network by transmitting the one word individual reference address to the communication resource allocator of the system that it is registered in. The communication resource allocator transmits the individual access codes to the communication resource allocator of the system that the targeted communication unit is registered in. That communication resource allocator then generates an individual reference address for the source communication unit and transmits it to the target communication unit. Thus, internally within each communication system, only one word, or bit frame, is transmitted between the communication unit and the communication resource allocator to generate the communication. Thus, the control channel traffic is reduced over prior art systems which require both the individual code and the home system code of the target and source communication units to be transmitted.

I claim:

1. In a network of communication systems, wherein each communication system includes a plurality of communication units, a limited number of communication resources that are transceived via a predetermined number of repeaters, and a communication resource allocator that allocates the limited number of communication resources among the plurality of communication units, wherein a communication unit of one communication system functions in any of the other communication systems in the network, and wherein the communication unit communicates either within the communication system that it is presently registered in or in any of the other communication systems of the communication system network, a method for reducing control channel traffic for each communication system within the communication system network, the method comprises the steps of:

a) initiating, by a source communication unit, a communication with at least one target communication unit;

b) generating, by the source communication unit, an individual reference address for each of the at least one target communication unit when the individual reference address does not exist within a local reference address database contained within said source communication unit;

c) transmitting the individual reference address for each of the at least one target communication unit to the communication resource allocator of the communication system that the source communication unit is registered in;

d) determining, by the communication resource allocator, whether the individual reference address for each of the at least one target communication unit is stored in a reference address database at said communication resource allocator;

e) updating the reference address database with the individual reference address for each of the at least one target communication unit when the individual reference address was not previously stored in the reference address database.

2. The method of claim 1, wherein step (b) further comprises storing the individual reference address and at least the individual unit identification and home communication system identification of the at least one target communication unit in the local reference address database when the individual reference address does not exist within the local reference address database.

3. The method of claim 1, wherein the determining whether the individual reference address is stored in the reference address database of step (d) further comprises accessing a network global reference address database.

4. The method of claim 3, further comprising updating the network global reference address database with an individual reference address of the source communication unit for each of the at least one target communication units.

5. The method of claim 4, further comprising updating said local reference address database with an individual reference address of the source communication unit for each of the at least one target communication units.

6. The method of claim 4, further comprising transmitting, from the communication resource allocator of the communication system that the source communication unit is registered in, the individual reference address of the at least one target communication unit to the communication resource allocator of the communication system that the at least one target communication unit is registered in.

7. The method of claim 6, further comprising transmitting, from the communication resource allocator of the communication system that the at least one target communication unit is registered in, the individual reference address of the source communication unit to the at least one target communication unit.

8. The method of claim 1, wherein the determining whether the individual reference address is stored in the reference address database of step (d) further comprises accessing a system reference address database of the communication system that the source communication unit is registered in.

9. The method of claim 8, further comprising transmitting, by communication resource allocator of the communication system that the source communication unit is registered in, at least the individual unit identification and home communication system identification of the at least one target communication unit and at least an individual unit identification and home communication system identification of the source communication unit to the communication resource allocator of the communication system that the at least one target communication unit is registered in.

10. The method of claim 9, further comprising generating an individual reference address for the source communication unit and transmitting the individual reference address of the source communication unit to the at least one target communication unit when the individual reference address of the source communication unit does not exist in a system reference address database of the communication system that the target communication unit is registered in.

11. The method of claim 10, further comprising updating a local reference address database in the at least one target communication unit with the individual reference address of the source communication unit when the individual reference address of the source communication unit does not exist within the local reference address database of the at least one target communication unit.

12. In a network of communication systems, wherein each communication system includes a plurality of communication units, a limited number of communication resources that are transceived via a predetermined number of repeaters, and a communication resource allocator that allocates the limited number of communication resources among the plurality of communication units, wherein a communication unit of one communication system functions in any of the other communication systems in the network, and wherein the communication unit communicates either within the communication system that it is presently registered in or in any of the other communication systems of the communication system network, a method for a communication unit to reduce control channel traffic when establishing a communication, the method comprises the steps of:

a) initiating, by a source communication unit, a communication with at least one target communication unit;

b) generating, by the source communication unit, an individual reference address for each of the at least one target communication unit when the individual reference address does not exist within a local reference address database contained within said source communication unit;

c) transmitting the individual reference address for each of the at least one target communication unit to the communication resource allocator of the communication system that the source communication unit is registered in; and d) updating a local reference address database with the individual reference address for each of the at least one target communication unit when the individual reference address was not previously stored in the local reference address database of the at least one target communication unit.

13. The method of claim 12, further comprising, for the at least one target communication unit, receiving an individual reference address of the source communication unit.

14. The method of claim 13, further comprising, for the at least one target communication unit, updating said local reference address database of the at least one target communication unit with the individual reference address of the source communication unit when the individual reference address was not previously stored in the local reference address database of the at least one target communication unit.

* * * * *